Jan. 12, 1926. 1,569,035
A. W. RICKS
PNEUMATIC SHOCK ABSORBER
Filed June 23, 1924   2 Sheets-Sheet 1

Inventor
A. W. Ricks.

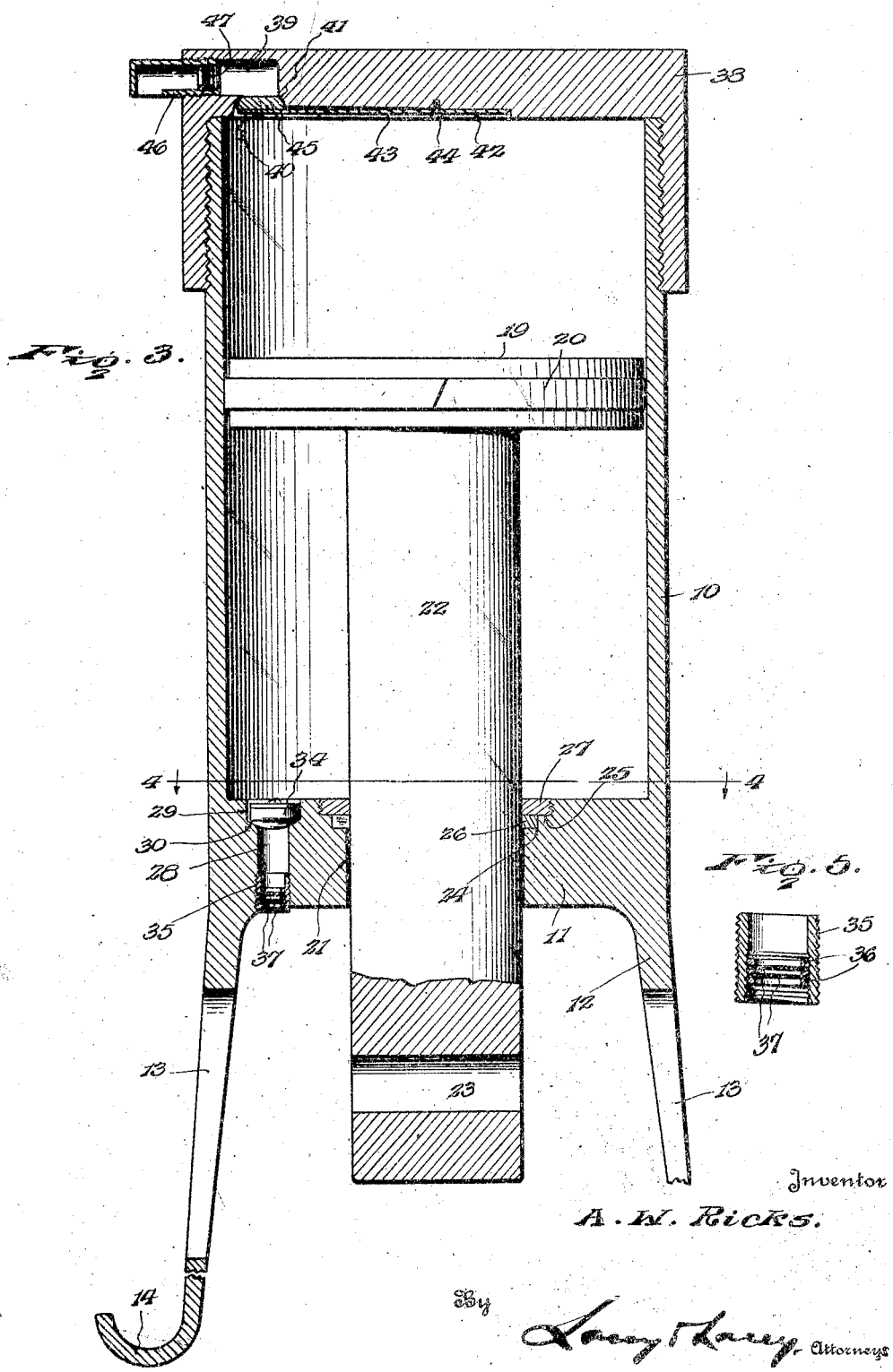

Patented Jan. 12, 1926.

1,569,035

UNITED STATES PATENT OFFICE.

ABSALOM W. RICKS, OF REXBURG, IDAHO.

PNEUMATIC SHOCK ABSORBER.

Application filed June 23, 1924. Serial No. 721,771.

*To all whom it may concern:*

Be it known that I, ABSALOM W. RICKS, a citizen of the United States, residing at Rexburg, in the county of Madison and State of Idaho, have invented certain new and useful Improvements in Pneumatic Shock Absorbers, of which the following is a specification.

This invention relates to an improved pneumatic shock absorber for vehicles, being particularly designed for use on motor vehicles, and seeks, among other objects, to provide a device of this character which will effectively function at all times to cushion the vehicle body when the springs are flexed as well as also cushion the rebound of the load when the springs return to normal.

The invention seeks, as a further object, to provide a device wherein the resistance of the device to the movement of the vehicle body, will progressively increase with the flexing of the springs.

And the invention seeks, as a still further object, to provide a device which may be readily applied and which will be entirely automatic in its operation.

Other and incidental objects will appear hereinafter.

In the drawings:

Figure 1 is a side elevation showing my improved shock absorber applied, a vehicle axle being shown in section, Figure 2 is a vertical sectional view on the line 2—2 of Figure 1, looking in the direction of the arrows, Figure 3 is an enlarged sectional view particularly showing the cushioning cylinder.

Figure 4 is a detail horizontal sectional view on the line 4—4 of Figure 3, looking in the direction of the arrows, and Figure 5 is a detail sectional view showing one of the air filters of the cylinder.

In carrying the invention into effect, I employ a cylinder 10 having a thickened end wall 11 and extending from the adjacent end of the cylinder is a pair of legs 12 provided with longitudinal slots 13 and formed at their lower ends with outwardly curved terminals 14. As shown in Figure 1 of the drawings, the terminals 14 of the legs are adapted to rest against the upper side of a vehicle spring, conventionally shown at 15, supporting the cylinder in vertical position at the outer side of the adjacent frame bar 16 of the vehicle. One of the vehicle axles is shown at 17 and, as will be observed, the cylinder is preferably disposed directly over the axle. Embracing the spring are U-bolts 18 engaging the terminals 14 of the legs 12 rigidly connecting the cylinder with the spring.

Slidable in the cylinder is a piston 19 preferably equipped with one or more resilient piston rings 20 and extending from the piston freely through an opening 21 in the bottom wall 11 of the cylinder is a piston rod 22 provided near its lower end with an opening 23. Formed in the bottom wall 11 at the inner end of the opening 21 therethrough are stepped concentric seats 24 and 25 and fitting in the former of said seats is a split resilient sealing ring 26 contracting about the piston rod 22 to form a sealed joint between said rod and the bottom wall of the cylinder. Screwed into the seat 25 is a retaining ring 27 abutting the sealing ring and removably securing said ring in position. However, it should be noted that the ring 27 does not clamp the ring 26 in its seat but only holds the ring 26 against vertical movement, thus leaving the sealing ring free to contract about the piston rod.

Formed through the bottom wall 11 of the cylinder 10 is a vertical air inlet passage 28 counterbored at its inner end to define a valve chamber 29 terminating in a valve seat 30, and formed in the inner face of said bottom wall to extend from the chamber 29 is, as best shown in Figure 4, an arcuate recess 31. Freely accommodated in said recess is a flat arcuate valve spring 32 secured near one end by a screw or other suitable fastening device 33 and detachably secured to the spring at its opposite end is a valve 34 freely accommodated in the chamber 29 to cooperate with the seat 30 held closed by the spring. Screwed into the passage 28 at its outer end is a filter shell 35 internally threaded, as shown in detail in Figure 5, to accommodate clamping rings 36 and clamped between said rings is a pair of air filtering screens 37. The rings 36 may, of course, be removed for displacing the screens. Screwed over the upper end of the cylinder 10 is a closure cap 38 having a thickened end wall and formed in the end wall of the cap is a radial air inlet passage 39 opening at its inner end into a valve chamber 40 in the lower face of said wall. At the bottom of the valve chamber is a valve seat 41 and extending from said chamber is a recess 42. Freely accommodated in said recess is a straight flat valve spring 43 removably secured near one end by a screw or other suitable fastening device 44 and detachably mounted upon the spring at its opposite end is a valve 45 freely received in the valve chamber 40 to cooperate with the seat 41 held closed by the spring. Screwed into the outer end of the passage 39 is an elbow-shaped filter shell 46, the inlet of which is presented downwardly so that dust or dirt cannot fall into the shell, and arranged in the inner end of the shell are spaced filtering screens 47 mounted like the screens 37. Bolted or othewise secured to the frame bar 16 at opposite sides of the cylinder 10 are angle brackets 48 provided at their forward ends, as particularly shown in Figure 2, with elongated slots 49 and extending through the opening 23 of the piston rod 22 and freely through the slots 13 of the legs 12 of the cylinder, is a cross rod 50 provided at its ends with reduced squared terminals 51 fitting in the slots 49 of the brackets. The rod is thus held against longitudinal movement as well as turning movement while the rod will be permitted to shift in the slots 49 under transverse movement of the frame bar relative to the spring 15.

As will now be seen in view of the foregoing description, when the spring 15 is flexed downwardly, the piston 19 will be shifted downwardly in the cylinder 10 so that the air in the lower end of the piston will be compressed for cushioning the downward movement of the load and, of course, as the downward movement of the piston continues, and the pressure upon the air in the lower end of the cylinder is increased, the resistance offered to the downward travel thereof will progressively increase. Upon downward movement of the piston 19, the valve 45 will be opened by piston suction so that air will be drawn into the upper end of the cylinder 10 above the piston, the air so drawn in being filtered by the screen 47 for excluding dust and dirt. Consequently, when the piston subsequently moves upwardly, incident to the rebound of the load and the return of the spring 15 to normal, the air above the piston will be compressed by the piston for cushioning such rebound. The device will, therefor, function to cushion the load in its movement toward the vehicle axle as well as away from said axle and, of course, as the piston 19 moves upwardly in the cylinder 10, the valve 34 will be opened by piston suction and air drawn into the lower end of the cylinder below the piston for cushioning subsequent downward movement of the piston, the air so drawn in being filtered by the screens 34.

Having thus described the invention, what I claim is:

1. A shock absorber including an air cylinder having a bottom wall, a cap closing the cylinder, means for connecting said cylinder with a vehicle axle, the bottom wall of the cylinder and said cap being provided with air inlet passages, spring closed inwardly opening air inlet valves at the inner ends of the passages, a piston reciprocable in the cylinder and having a piston rod slidable through said bottom wall, means for connecting the piston rod with a vehicle frame, and air filtering means mounted in said passages.

2. A shock absorber including an air cylinder having end walls, a piston reciprocable in the cylinder and having a piston rod slidable through one of said end walls, said end walls being provided with air inlet passages and being formed at the inner ends of said passages with valve chambers having recesses extending therefrom, springs secured near corresponding ends thereof in said recesses, inwardly opening air inlet valves carried by the springs and normally held closed thereby in said valve chambers, and means for connecting the piston rod with a vehicle frame.

3. A shock absorber including an air cylinder having an end wall provided with an opening therethrough and formed at the inner end of said opening with stepped concentric seats, a piston reciprocable in the cylinder and having a piston rod slidable through said opening, a sealing ring fitting in one of said seats and contracting about the piston rod to form a sealed joint between the rod and said wall, a retaining ring mounted in the other of said seats securing said sealing ring in position, inwardly opening air inlet valves at opposite ends of the cylinder, and means for connecting the piston rod with a vehicle frame.

4. A shock absorber including an air cylinder having legs to rest upon a spring of a vehicle supporting the cylinder in vertical position adjacent a frame bar of the vehicle, means engaging said legs connecting the cylinder with the spring, a piston reciprocable in the cylinder and having a piston rod, inwardly opening air valves at opposite ends of the cylinder, and means connecting the piston rod with said frame bar.

5. A shock absorber including an air cylinder, means for connecting said cylinder with an axle of a vehicle to extend adjacent a frame bar of the vehicle, a piston reciprocable in the cylinder and having a piston rod, air inlet valves at opposite ends of the cylinder, spaced brackets mounted upon said bar and provided with elongated slots extending transversely with respect to the axis of the cylinder, and a cross rod engaged with the piston rod and provided with terminals slidable in said slots and connecting the piston rod with said frame bar.

6. A shock absorber including an air cylinder, a piston reciprocable in the cylinder and having a piston rod, valves for admitting air to opposite ends of the cylinder, yieldable means housed within the cylinder and normally holding the valves closed, and means for connecting the cylinder and piston rod one with a vehicle frame and the other with the vehicle axle.

7. A shock absorber including an air cylinder, a piston reciprocable therein and having a piston rod, valves for admitting air to opposite ends of the cylinder, yieldable means mounting the valves and normally holding said valves closed, and means for connecting the cylinder and piston rod one with a vehicle frame and the other with the vehicle axle.

8. A shock absorber including an air cylinder, a piston reciprocable therein and having a piston rod, opposite walls of the cylinder being provided with air inlet passages, spring actuated valves normally closing said passages, air filtering means mounted in said passages, and means for connecting the cylinder and piston rod one with a vehicle frame and the other with the vehicle axle.

9. A shock absorber including an air cylinder, a piston reciprocable therein and having a piston rod, opposite walls of the cylinder being provided with air inlet passages, spring actuated valves normally closing said passages, filtering shells secured in said passages, filtering screens disposed within the shells, clamping rings engaged in said shells and clamping the screens therebetween, and means for connecting the cylinder and piston rod one with a vehicle frame and the other with the vehicle axle.

10. A shock absorber including an air cylinder, a piston reciprocable therein and having a piston rod, flat springs fixed at corresponding ends thereof and having their opposite ends free, air inlet valves for admitting air to opposite ends of the cylinder and mounted upon the latter ends of said springs to be normally held closed by said springs, and means for connecting the cylinder and piston rod one with a vehicle frame and the other with the vehicle axle.

11. A shock absorber including an air cylinder, a piston reciprocable in the cylinder and having a piston rod slidable through a wall of the cylinder, yieldable means contracting about the piston rod to form a closed joint between said rod and said wall, valves for admitting air to opposite ends of the cylinder, and means for connecting the cylinder and piston rod one with a vehicle frame and the other with the vehicle axle.

12. A shock absorber including an air cylinder, means for connecting said cylinder with an axle of a vehicle to extend adjacent a frame bar of the vehicle, a piston reciprocable in the cylinder and having a piston rod, valves for admitting air to opposite ends of the cylinder, spaced brackets mounted upon said frame bar, and a cross rod extending between said brackets and engaged with the piston rod for connecting the piston rod with said frame bar.

In testimony whereof I affix my signature.

ABSALOM W. RICKS. [L. S.]